United States Patent [19]

Zhu et al.

[11] Patent Number: 5,679,756
[45] Date of Patent: Oct. 21, 1997

[54] OPTICAL THERMOPLASTIC THIOURETHANE-URETHANE COPOLYMERS

[75] Inventors: Zhenya Zhu, Stratford; Brian G. Risch, Milford; Zhou Yang, Milford; Yin-Nian Lin, Milford, all of Conn.

[73] Assignee: Optima Inc., Stratford, Conn.

[21] Appl. No.: 548,806

[22] Filed: Dec. 22, 1995

[51] Int. Cl.$^6$ .................................................. C08G 18/10
[52] U.S. Cl. .................... 528/65; 528/66; 528/67; 525/451; 525/457; 525/458
[58] Field of Search ........................... 528/65, 66, 67; 525/451, 457, 458

[56] References Cited

U.S. PATENT DOCUMENTS

| | | | |
|---|---|---|---|
| 3,384,653 | 5/1968 | Erner et al. | 260/453 |
| 3,394,164 | 7/1968 | McClellan | 260/453 |
| 3,642,964 | 2/1972 | Rausch, Jr. et al. | 264/40 |
| 3,644,457 | 2/1972 | Konig et al. | 260/453 |
| 3,883,571 | 5/1975 | Allport et al. | 260/453 |
| 3,963,679 | 6/1976 | Ullrich et al. | 260/75 |
| 4,031,026 | 6/1977 | Ibbotson | 252/182 |
| 4,115,429 | 9/1978 | Reiff et al. | 260/453 |
| 4,118,411 | 10/1978 | Reiff et al. | 260/453 |
| 4,245,081 | 1/1981 | Quiring | 528/65 |
| 4,261,946 | 4/1981 | Goyert et al. | 264/211 |
| 4,342,847 | 8/1982 | Goyert et al. | 525/66 |
| 4,376,834 | 3/1983 | Goldwasser et al. | 521/159 |
| 4,438,250 | 3/1984 | Grogler et al. | 528/66 |
| 4,463,154 | 7/1984 | Disteldorf et al. | 528/45 |
| 4,567,236 | 1/1986 | Goldwasser et al. | 525/127 |
| 4,595,709 | 6/1986 | Reischl | 521/79 |
| 4,689,387 | 8/1987 | Kajimoto et al. | 528/76 |
| 4,762,883 | 8/1988 | Goel | 525/113 |
| 4,780,522 | 10/1988 | Kajimoto et al. | 528/76 |
| 4,882,408 | 11/1989 | Blum | 528/49 |
| 5,059,673 | 10/1991 | Kanemura et al. | 528/67 |
| 5,066,732 | 11/1991 | Savino et al. | 525/440 |
| 5,089,571 | 2/1992 | Bonk et al. | 525/457 |
| 5,352,758 | 10/1994 | Kanemura et al. | 528/85 |
| 5,371,167 | 12/1994 | Rehfuss et al. | 528/73 |
| 5,395,909 | 3/1995 | Shimuta et al. | 528/49 |
| 5,455,312 | 10/1995 | Heidingsfeld et al. | 525/457 |

FOREIGN PATENT DOCUMENTS

| 2019877 | 12/1990 | Canada. |
|---|---|---|
| WO 91/00304 | 1/1991 | WIPO. |

OTHER PUBLICATIONS

ANTEC '94, Continuous Polymerization In A Back–Mixed Drag Flow Reactor, Lu, Biesenberger and Todd, Department of Chemistry and Chemical Engineering, Stevens Institute of Technology, Hoboken, New Jersey 07030, pp. 113–115, 1994.

*Primary Examiner*—Rachel Gorr
*Attorney, Agent, or Firm*—DeLio & Peterson, LLC

[57] ABSTRACT

A process for making thermoplastic thiourethane-urethane copolymers for use in making optical products preferably comprising reacting an aliphatic diisocyanate with a dithiol under polymerization conditions to form a thiourethane prepolymer which is then reacted with a diisocyanate such as methylene bis(phenyl isocyanate) and a polyol such as a diaromatic containing diol such as ethoxylated Bisphenol A or an aliphatic isocyanate reactive monomer such as tricyclodecane dimethanol or 1,4-dimethanol cyclohexane to form the copolymer product. The polymers have a combination of high refractive index and high Abbe No. The polymers also have high impact strength, high hardness and Tg's above 100° C. It is preferred to make the polymer in an extruder.

31 Claims, No Drawings

OPTICAL THERMOPLASTIC THIOURETHANE-URETHANE COPOLYMERS

BACKGROUND OF THE INVENTION

1. Field of the Invention

This invention relates to optical polymers and, in particular, to optical thermoplastic thiourethane-urethane copolymers containing both thiourethane and urethane links prepared preferably by reacting an aliphatic containing diisocyanate and a dithiol to form a thiourethane prepolymer and then reacting the prepolymer with a diisocyanate and/or a diol and to form thermoplastic polymers useful to make optical products.

2. Description of Related Art

Polymeric materials are used extensively as substitutes for glass in optical products such as lenses. The use of polymeric materials over glass offers several practical advantages. Since polymeric materials have a lower density than inorganic glass, there can be a great reduction in weight of the optical product.

Additionally polymeric materials may offer great improvement over glass in terms of impact resistance. The improved processability and other characteristics such as tintability make polymeric materials especially attractive as a material for ophthalmic lenses. A variety of polymeric materials including polycarbonates, polystyrenes, acrylic polymers, polythiourethane, polyurethane and polysulfones have already been used for optical applications. Each of these materials offers a somewhat different combination of physical and optical properties which lead to advantages and disadvantages for optical applications.

Considerable research has been directed towards development of polymers with a combination of properties which make them well suited for optical applications. Generally, a high refractive index is of principal importance for an optical material since the use of a high refractive index material allows for production of thinner lenses when designing lenses of the same power and design. Reduction of edge thickness of the lens offers practical advantages in terms of weight savings and aesthetic reasons. Another important consideration for optical materials is optical dispersiveness. The value of optical dispersiveness is typically characterized by the Abbe number. Materials with high Abbe numbers show little optical dispersiveness while materials with low Abbe numbers show high optical dispersiveness. A high Abbe number is desired for optical materials since this will lead to reduced chromatic aberration and better image clarity for a given lens design and thickness. Typically polymers with high refractive indices also possess low Abbe numbers. An Abbe number above about 32 is considered to be high enough for the desired eyeglass application. Therefore, when using an optical material, it is very important to balance refractive index and Abbe number so that both are suitable for the end product. Optimally, both refractive index and Abbe number should be high, e.g., above about 1.58 and approaching 1.60 and above 32, respectively.

Several other considerations are of importance for optical materials, especially for use in ophthalmic lenses. Tintability and weather resistance are both especially important properties for ophthalmic lens materials. Additionally, properties such as optical clarity and transparency, color, hardness, machinability, processability and the like must also meet certain property levels in optical materials.

Other important properties for ophthalmic lenses are that the lenses have a Tg above about 100° C., a Shore D Hardness greater than 85 and an impact strength which surpasses the specifications set forth in FDA21CFR801.410 for street wear and ANSI Z-87.1-1989 for educational and occupational wear.

The prior art optical polymers are predominately thermosetting resins which are made by a casting process wherein the ingredients are mixed and polymerized in a mold under carefully controlled conditions for a relatively long period of time such as 24 hours. Such thermosetting resins are shown in U.S. Pat. Nos. 4,689,387 and 5,352,758, both patents are incorporated herein by reference. No. 4,689,387 shows S-alkyl thiocarbamate base lens resins obtained by reacting one or more NCO-containing compounds with one or more SH-containing aliphatic compounds. No. 5,352,758 shows a lens resin which is a sulfur containing urethane resin made by reacting an isocyanate compound with a specially defined mercapto compound.

Thermoplastic polymers have a number of advantages over thermosetting resins since they can be manufactured or processed by an extrusion process which can directly produce a finished optical product or the polymer in a form such as pellets. Since the polymer is thermoplastic the pellets may be plasticized and molded into the desired form by high speed machines such as injection molding machines. Unfortunately, current commercially available thermoplastic polyurethane polymers do not have the properties necessary for use as an optical lens product and have low Tg, low hardness, high yellowness and a poor refractive index and Abbe number combination.

Bearing in mind the problems and deficiencies of the prior art, it is accordingly an object of the present invention to provide thermoplastic polymers having a combination of properties which are superior in many aspects to those of existing optical polymeric materials including thermosetting resins. It is another object of the present invention to provide a process for preparing thermoplastic optical polymers having a superior combination of physical and optical properties. A further object is to provide thermoplastic polymers useful for numerous applications including optical products. It is a further object of the invention to enhance both weathering stability and yellowness relative to other commercial thermoplastic polymers as well as increasing the Tg while still maintaining a high level of impact strength. The thermoplastic thiourethane-urethane polymers described herein offer similar properties to thermoset polyurethane or polythiourethane resins in that the resins have low, if any, yellowness, enhanced tintability and weathering stability. The polymers also have enhanced impact strength, refractive index and Abbe number properties.

Still other objects and advantages of the invention will in part be obvious and will in part be apparent from the specification.

SUMMARY OF THE INVENTION

It has been discovered that when a thiourethane prepolymer (such as an oligomer) is reacted with one or more polyurethane forming monomers a thermoplastic polymer is formed having excellent properties for use in optical products such as eyeglass lenses. Polyurethane forming monomers may be generally defined as organic polyisocyanates and monomers having Zerewitinoff active groups particularly OH and SH. The molar ratio of isocyanate group to active group used to form the prepolymer can range widely depending on the proposed use for the final resin product and may be about 0.5:1 to 3:1 typically 0.9:1 to 1.1:1, preferably 0.95:1 to 1.05:1 and most preferably 0.98:1 to 1.02:1 ,e.g., substantially equimolar. To form the final thermoplastic polymer product the molar ratio of isocyanate groups used to form the prepolymer and the final polymer to the total active groups used to form the prepolymer and the final polymer is about 0.95:1 to 1.10:1, preferably substantially equimolar e.g., 1.0:1 to 1.05:1.

It is preferred to react an aliphatic diisocyanate with a dithiol in substantially equimolar amounts to form the thiourethane prepolymer and the prepolymer then reacted with a diisocyanate and/or a diol, preferably both a diisocyanate and a diol, to form thermoplastic thiourethane-urethane copolymers. The polymers have optical and physical properties needed for optical products such as eyeglass lenses. Among these properties are a balanced high refractive index above about 1.58 and high Abbe number above about 32. Depending on the monomers used a polymer having further enhanced properties such as impact resistance passing specifications for impact resistance set forth in both FDA and ANSI standards, supra and/or Tg's above 100° C. are obtainable.

The monomer composition preferably used to form the thiourethane prepolymer comprises an aliphatic polyisocyanate, preferably a diisocyanate and most preferably a cycloaliphatic diisocyanate monomer and a polythiol, preferably a dithiol. A polyisothiocyanate monomer or a polyisocyanate monomer containing at least one isothiocyanate group may be employed to make the prepolymer and for convenience, the terms polyisocyanate and diisocyanate will be meant to include isocyanate, isothiocyanate, and isocyanate monomers containing at least one isothiocyanate group, or mixtures thereof. Depending on the diisocyanate used, the diisocyanate reactive material may be a polythiol, polyol, or mixtures thereof.

Monomers such as polyamines may be used but are not preferred. Regardless of the reactants employed to form the prepolymer it is essential to form a thiourethane prepolymer which prepolymer may also be defined as a thiourethane oligomer or polymer having thiourethane links in the polymer chain and having endgroups reactive with polyurethane forming monomers, preferably isocyanate endgroups, thiol endgroups or any combination of isocyanate and/or thiol endgroups. Also for convenience, the prepolymer described herein will be directed to a thiourethane prepolymer made from an aliphatic or cycloaliphatic diisocyanate and a dithiol although it will be understood that other reactants to make the thiourethane prepolymer may be employed as discussed herein.

The terms prepolymer and oligomer may be used interchangeably and represent low molecular weight polymerized reaction products typically having a molecular weight less than about 100,000, although higher molecular weights are possible. In general, the molecular weight of prepolymers made herein are a solid at room temperature and have a molecular weight of about 1,000 to 30,000, preferably 1,000 to 20,000 and typically about 2,000 to 10,000. At a temperature of about 160° C. the preferred prepolymers are estimated to have a viscosity of about 10,000 centipoise.

The prepolymer will have thiourethane links (—NHCOS—) when the reactants are a diisocyanate and a dithiol. If a dithioisocyanate monomer or a monomer having both isocyanate and thioisocyanate groups and/or a polythiol or polyol are used to make the prepolymer the "thiourethane" links will vary in the prepolymer and may be —NHCOS—, —NHCSO— and —NHCSS—. The preferred thiourethane links are —NHCOS—.

A preferred polymer for eyeglass lenses is formed by the reaction of a cycloaliphatic diisocyanate such as 4,4'-methylene bis (cyclohexyl isocyanate) and a dithiol such as bis(2-mercaptoethyl) sulfide under polymerization reaction conditions to form a thiourethane prepolymer. The prepolymer is then reacted with diisocyanates such as methylene bis(phenyl isocyanate) (MDI) monomer, especially the 4,4' isomer, and/or diols such as bisphenol A, ethoxylated bisphenol A (preferably 1 or 2 ethoxylate units), tricyclodecane dimethanol and cyclohexane dimethanol.

In a further aspect of the invention, it is preferred to react the thiourethane prepolymer with both a diisocyanate and a diol and that each monomer be added separately to the prepolymer and preferably sequentially, preferably in an extruder such as a twin screw extruder.

The polymer is formed as a linear thermoplastic polymer which final polymer may be defined as a thiourethane-urethane copolymer which copolymer has thiourethane and urethane links with thiourethane links predominating in the prepolymer structure and urethane links predominating in the urethane structure of the final polymer. It is hypothesized that the endgroups of the prepolymer react with the polyurethane forming monomers and that the polyurethane monomers react with themselves resulting in prepolymer chains linking with growing diisocyanate-diol (urethane link) chains as well as prepolymer chains linking together and linking with diisocyanate-diol (urethane link) chains. A resulting structure may be characterized as a thiourethane-urethane copolymer having blocks of thiourethane and urethane chains. The polymer can be injection molded or compression molded into optical and other products at high production rates.

DESCRIPTION OF THE PREFERRED EMBODIMENT(S)

Polyisocyanates to prepare polyurethane resins are well known in the art and include the aliphatic, cycloaliphatic, aromatic, araliphatic and heterocyclic diisocyanates such as those described in U.S. Pat. Nos. 3,963,679; 4,261,946; 4,342,847; 4,376,834; 4,567,236; 4,595,709 and 5,089,571 and WO91/00304, which patents are hereby incorporated by reference.

To form the thiourethane prepolymer used in the process of the invention it is highly preferred to employ an aliphatic polyisocyanate, preferably a diisocyanate and most preferably a cycloaliphatic diisocyanate. The preferred monomer is 4,4'-methylene bis(cyclohexylisocyanate) because of its demonstrated effectiveness.

Cycloaliphatic diisocyanates include methylenebis (cyclohexyl isocyanate) including the 4,4'-isomer, the 2,4'-isomer and mixtures thereof and all the geometric isomers thereof including trans/trans, cis/trans, cis/cis and mixtures thereof, 4,4'-isopropylidenebis(cyclohexyl isocyanate), 4,4'-diisocyanatodicyclohexyl, and all geometric isomers and mixtures thereof, 2,5-bis(isocyanatomethyl)bicyclo-(2.2.1) heptane and 4,8-bis(isocyanatomethyl)tricyclo[5.2.0$^{2,6}$] decane.

Some suitable polyisocyanate monomers may be defined by the general formula:

$$R(NCY)_x \qquad (I)$$

wherein x is an integer of 2–4, Y is O or S, R represents an aliphatic hydrocarbon group having 2 to 18 , preferably 6 to 10 carbon atoms; a cycloaliphatic hydrocarbon group having 4 to 15, preferably 5 to 10 carbon atoms. Examples include 1,6 hexamethylene diisocyanate, 1,12 dodecane diisocyanate, cyclobutane-1,3 diisocyanate, and the like. Diisocyanates are preferred and if polyisocyanates are used having a high functionality care must be taken to ensure that the prepolymer and polymer end product are both thermoplastic.

Polythiols are preferably used to react with the diisocyanate and are preferably dithiols and may be selected from a wide variety of polythiol monomers. Some polythiols and other active hydrogen containing monomers useful in the invention may be represented generally by the formula:

wherein R is an organic group consisting of polyvalent aliphatic or alicyclic hydrocarbons preferably having 2 to 10 carbon atoms; Z is an integer of 1 to 3; and A is O, S or NH. A is preferably S.

Typical examples of polythiol compounds represented by the general formula where A is sulfur include 1,2-ethanedithiol, propane-1,2-dithiol, n-hexane 1,6-dithiol, n-decane-1,10-dithiol, 1,3-cyclohexanedithiol and 1,4-cyclohexanedithiol.

Other exemplary polythiols include bis(2-mercaptoethyl) ether, 1,2-bis(mercaptomethylthio)benzene and 1,4-dimercaptobenzene. Aliphatic polythiols containing sulfur atoms in addition to mercapto groups are highly preferred because of their demonstrated effectiveness and include bis(2-mercaptoethyl) sulfide.

The preferred aliphatic diisocyanate and dithiol monomers are reacted under polymerization conditions to form the thiourethane prepolymer which forms the starting (precursor) material to form the final thermoplastic thiourethane-urethane copolymer which may be used to make optical products. In general, the aliphatic polyisocyanate and polythiol are mixed and degassed. Additives may then be added to the mixture to impart desired properties of the resin. Exemplary additives include antioxidants, UV stabilizers, plasticizers, colorants, etc. A polymerization catalyst is also preferably added to the mixture and typical catalysts include tertiary amines, dibutyltin dilaurate, dibutyltin dichloride, dimethyltin dichloride, dimethyltin dibromide, etc.

To make the prepolymer a molar ratio of isocyanate groups to thiol groups is generally about 0.80 to 1.20, preferably 0.95 to 1.05, e.g., equimolar. The polyurethane forming monomers added to the prepolymer to form the final polymer product are added in amounts to form a molar ratio of isocyanate to isocyanate reactive monomers based on the total polymer composition of about 0.90:1 to 1.10:1, preferably 1.0:1 to 1.05:1.

The prepolymer forming mixture is preferably degassed then heated at an elevated temperature generally 80°–130° C. for about ½ to 1 hour although it will be understood to those skilled in the art that lower or higher temperatures and/or longer or shorter reaction times may be employed depending on the reaction rates and/or prepolymer desired. It is important that the polymerization reaction be conducted in the substantial absence of water and under an inert cover such as nitrogen. The polymerization reaction is stopped when the desired thiourethane prepolymer is formed as generally determined by viscosity. In general, the prepolymer molecular weight is generally up to 100,000 or more, preferably about 1,000 to 20,000 and most preferably about 2,000 to 10,000 although prepolymers having lower or higher molecular weights may be used depending on processing and final polymer product requirements. The prepolymer is then reacted with polyurethane forming monomers, e.g., a diisocyanate and/or a hydrogen active material such as a polyol. Preferably an aromatic diisocyanate and a diol as described herein are reacted with the prepolymer to form the final thermoplastic polymer product. The molecular weight of the final polymer product is typically 100,000 to 500,000 or higher.

The polyurethane forming monomers may be any of the well-known reactants such as methylenebis(phenyl isocyanate) and its derivatives (hereinafter MDI) including the 4,4'-isomer, the 2,4'-isomer and mixtures thereof. Also included are the modified forms of methylenebis(phenyl isocyanate). By the latter are meant those forms of methylenebis(phenyl isocyanate) which have been treated to render them stable liquids at ambient temperature (circa 20° C.). such products include those which have been reacted with a minor amount (up to about 0.2 equivalents per equivalent of polyisocyanate) of an aliphatic glycol or a mixture of aliphatic glycols such as the modified methylenebis(phenyl isocyanates) described in U.S. Pat. Nos. 3,394,164; 3,644,457; 3,883,571; 4,031,026; 4,115,429; 4,118,411; and 4,299,347, which patents are incorporated herein by reference. The modified methylenebis (phenyl isocyanates) also include those which have been treated so as to convert a minor proportion of the diisocyanate to the corresponding carbodimide which then interacts with further diisocyanate to form uretone-imine groups, the resulting product being a stable liquid at ambient temperatures as described, for example, in U.S. Pat. No. 3,384,653. Mixtures of any of the above-named polyisocyanates can be employed if desired.

The most preferred species within this group is the 4,4'-methylenebis(phenyl isocyanate).

Other organic polyisocyanates include aromatic or aliphatic compounds such as o, m and p) xylylene diisocyanate, hexamethylene diisocyanate, tolylene diisocyanate, ethylene diisocyanate, phenylene diisocyanate, and the like.

The diisocyanates used in both the prepolymer and final polymerization process include their halogen-substituted derivatives, such as chlorine-substituted derivatives and bromine-substituted derivatives, alkyl-substituted derivatives, alkoxy-substituted derivatives, nitrosubstituted derivatives, prepolymer-type derivatives modified with polyhydric alcohols, carbodimide modified derivatives, urea-modified derivatives, biuret-modified derivatives, dimerized reaction products, trimerized reaction products, and the like.

The other polyurethane forming monomers reactive with the organic polyisocyanates preferably are diols and may be monomers having suitable active hydrogen containing groups as determined by the Zerewitinoff method including—$NH_2$, —NH—, —COOH, and the like. The preferred polyols contain two active hydrogen containing groups and are aliphatic or cycloaliphatic diols, including alkane and cycloalkanes. Compounds which contain two or more different groups within the above-defined classes may also be used in accordance with the process of the present invention, such as an amino group and one hydroxyl group and the like. Also, compounds may be used which contain one —SH group and one —OH or two —OH groups and one —SH group as well as those which contain an amino group and an —SH group and the like.

Cyclic diols are preferred to make the thermoplastic polymers of the invention to provide a Tg greater than 100° C. and include the bis(hydroxyalkyl)cycloalkanes and the cycloalkane diols described in U.S. Pat. No. 4,822,827 as having 4 to 12 cycloaliphatic carbon atoms. Illustrative of such diols are 1,4-cyclohexanedimethanol, hydroquinone, 1,2-cyclohexanediol, 1,3-cyclohexanediol, 1,4-cyclohexanediol, 2-cyclohexene-1,4-diol, 2-methyl-1,4-cyclohexanediol, 2-ethyl-1,4-cyclohexanediol, 1,3-cycloheptanediol, 1,4-cycloheptanediol, 2-methyl-1,4-cycloheptanediol and 4-methyl-1, 3-cycloheptanediol; 4,4'-methylenebis(cyclohexanol), 4,4'-methylenebis(2-methylcyclohexanol), 4,4'-methylenebis(3-methylcyclohexanol), 3,3 '-methylenebis(cyclohexanol), 4,4'-ethylenebis(cyclohexanol), 4,4'-propylenebis-(cyclohexanol), 4,4'-butylenebis(cyclohexanol), 4,4'-isopropylidenebis(cyclohexanol), 4,4'-isobutylene-bis (cyclohexanol), 4,4'-isobutylene-bis(cyclohexanol), 4,4'-dihydroxydicyclohexyl, 4,4'-carbonylbis(cyclohexanol), 3,3 '-carbonylbis(cyclohexanol), 4,4'-sulfonylbis(cyclohexanol) and 4,4'-oxybis(cyclohexanol); and mixtures of any of the above. 1,4-cyclohexanedimethanol and tricyclodecane dimethanol are preferred.

Diaromatic containing diols especially Bisphenol A and Bisphenol A derivatives are also preferably employed in the composition and process of the invention to provide the enhanced polymer properties especially the combination of high Tg and impact strength.

The following are examples of suitable diaromatic containing dihydroxy compounds: 4,4'-dihydroxy diphenyl; bis-(hydroxyphenyl)-alkanes, such as $C_1$–$C_8$-alkylene-bis-phenols and $C_2C_8$-alkylidene-bis-phenols; bis-(hydroxy phenyl)-cycloalkanes, such as $C_5$–$C_{15}$-cycloalkylene- and $C_5$–$C_{15}$-cycloalkylidene-bisphenols; bis-(hydroxy phenyl)-sulfides,-ethers,-ketones,-sulfoxides and sulfones; also a,a-bis-(hydroxy phenyl)-diisopropyl benzene and the corresponding compounds which are alkylated or halogenated in the nucleus, polycarbonates based on bis-(4-hydroxy phenyl)-propane-(2,2) (bisphenol A); bis-(4-hydroxy-3,5-dichlorophenyl)-propane-(2,2) (tetrachloro bisphenol A); bis-(4-hydroxy-3,5-dibromo phenyl-propane-(2,2) (tetrabromo bisphenol A); bis-(4-hydroxy-3,5-dimethylphenyl)-propane-(2,2) (tetramethyl bisphenol A); bis-(4-hydroxy phenyl)- cyclohexane-(1,1 ) (bisphenol Z) and compounds based on tri-nuclear bis-phenols, such as a,a-bis-(4-hydroxy phenyl)-p-diisopropyl benzene.

The preferred Bisphenol A derivatives are propylene oxide and ethylene oxide adducts of bisphenol-A, with the adduct having from 1–10 units preferably 1–4 units and most preferably 1–2 units.

The active-hydrogen containing compounds may be used singly or in combination as a mixture.

The polyurethane forming monomers such as aromatic diisocyanates and diol monomers are generally used based on the total composition (prepolymer plus polyurethane forming monomers ) to provide final polymer products having an isocyanate to active hydrogen groups molar ratio of 1.0:1 to 1.05 to 1.

The prepolymer reaction mixture and the monomer composition and prepolymer mixture to be subjected to a polymerization reaction to form the final polymer product can also contain conventional additives such as an antistatic agent, a heat stabilizer, an ultraviolet absorbent, an antioxidant, dyes and/or one of more other auxiliary additives in accordance with the intended end use of the polymer to be formed.

A reaction catalyst is preferably employed in both the prepolymer and final polymerization process of the invention to control the reaction rate. Any catalyst known in the art to be suitable for use in producing polythiourethanes and polyurethanes may be employed. Exemplary catalyst include tertiary amines and organo-tin compounds. The total amount of catalyst needed for the two polymerization reactions may be used in the prepolymer reaction with the excess catalyst being available for the next final polymerization process.

An internal mold release agent (lubricant) may be incorporated in the final polymerization mixture for easier and better mold release of the resin from the injection or other mold with the resulting lens having a higher profile of regularity. Exemplary suitable internal mold release agents for use in the present invention include: fluorine containing nonionic surfactants, alkyl quaternary ammonium salts, acid phosphate ester, higher fatty acid ester, fatty acid and silicon containing nonionic surfactants.

The optical polymers of the present invention are formed as a linear polymer system for injection molding or compression molding processes. Such linear polymer systems may be formed by polymerizing the prepolymer forming mixture and then continuing the prepolymer reaction by adding the diisocyanate and/or diol monomers and containing the polymerization reaction. Catalysts in an amount of 10–5000 ppm may be used in either or both reaction mixtures. The reaction time for each polymerization reaction may be 20 seconds to 20 minutes or more. The resultant polymer may be subjected to common purification process to eliminate unreacted monomers and other impurities. It is important to carry out the process in the absence of water and air and an inert gas blanket such as nitrogen is typically used. A preferred process uses reaction extrusion as follows.

U.S. Pat. No. 3,642,964 is hereby incorporated by reference and discloses a process for the continuous production of thermoplastic noncellular polyurethanes by reaction extrusion in an extruder having three zones, a feed zone, a mixing zone and an extrusion zone.

The final polymer of the subject invention may be produced by reaction extrusion in an extruder having three or more zones which may include some or all of the following: a prepolymer feed zone or prepolymer forming monomer feed zone, a prepolymer plasticizing zone or a prepolymer reaction zone, polyurethane forming monomer feed zones, e.g., a polyol and polyisocyanate feed zone, a mixing/reaction zone which is preferably the zone with the longest residence time, a devolatilization/extraction zone, and/or a cooling and conveying zone.

It is an important feature of this invention that the prepolymer and monomer feed ports be maintained under a positive pressure of nitrogen or some other inert gas. Additionally nitrogen or some other inert gas may be injected directly into the partially filled barrel in the prepolymer plasticizing section to displace and purge any atmospheric moisture out of the feed port. The use of nitrogen or some other inert gas causes a substantial reduction in yellowness of the extruded polymer well as a reduction in bubble formation.

Typically the prepolymer is added first via a high precision gravimetric or volumetric feeder commonly used in the art for metering solid feeds. The prepolymer is then plasticized as it is conveyed to the next feed zone where the polyisocyanate and polyol are fed into the barrel through injection ports. These monomers are typically injected using high precision gear pumps or some other such pump commonly used in the art for delivery of viscous monomers. Typically the monomers are preheated so that they are molten and/or to reduce their viscosity. The monomer delivery pumps are typically calibrated with each other as well as with the prepolymer feeder to result in, based on the final polymer, an isocyanate to active hydrogen groups molar ratio of about 1:1 to 1.05:1. Optionally, the prepolymer may be formed directly in the extruder by injecting prepolymer forming monomers directly into the extruder using high precision liquid metering pumps such as gear pumps. The prepolymer plasticizing zone is then replaced by a reaction zone where the prepolymer is formed and conveyed to the next zone of the extruder.

When all the reactive components are fed into the extruder they are conveyed into a mixing/reaction zone where additional polymerization takes place and the high molecular weight characteristic of the final polymer product is achieved as discussed hereabove. Typically the polymer is subjected to a combination of dispersive and distributive mixing within the mixing/reaction zone so that a homogeneous product is achieved. Dispersive and distributive mixing may occur by interchange between screws, shearing between screws, shearing between screws and cylinder walls, as well as by incorporation of high shear mixing devices commonly used in the art such as broad edged kneading elements which are commonly used in intermeshing twin screw extruders. A counter rotating non-intermeshing twin screw geometry is preferred since this screw geometry provides the least intensive shearing forces which forces are known to cause some degradation of extruded polyurethanes. The counter rotating non-intermeshing screw geometry tends to result in less torque per screw length which may also allow longer reaction zones which may be required for some reaction mixtures. Additionally, reverse flighted screw sections may be included on one of the screws within the reaction zone to provide an additional increase in residence time for slower reacting formulations. Typically the temperature within the reaction/mixing zone is 190° C. to 210° C., but this may vary widely depending on the reactants used and polymer desired.

When the polymer product passes from the reaction/mixing zone it may pass into a zone where devolatilization takes place and low molecular weight species such as residual catalyst are extracted.

The final zone which the polymer passes through is the extrusion zone where the polymer is cooled to slightly above its glass transition temperature and is passed through a die to produce an extrudate with an appropriate cross section as it leaves the extruder. As the polymer exits the extruder at a temperature preferably below 175° C., it is protected and cooled by nitrogen or some other inert gas.

In a preferred embodiment, the feed zone, mixing zone and extrusion zone are composed of a single barrel having a cylindrical interior into which are fitted twin parallel shafts. Said shafts have fabricated thereon, in the appropriate order and location, the screw threads necessary to form the positive displacement means of the feed zones, the kneading elements, if used, which may be included in the mixing zone or zones, and the screw threads necessary for positive displacement of polymer through the devolatilization zone, if present, and through the cooling zones to the extrusion zone. Said multipurpose shafts can be driven from a single power source with appropriate gearing so that rate and direction of rotation can be adjusted as desired.

The interconnecting feed zone, mixing zone, and extrusion zones are fabricated or assembled so that they are provided throughout their lengths with a plurality of individual heating and or cooling elements so that the temperature of the reaction mixture passing through said zones can be controlled incrementally, i.e., for the purpose of controlling the temperature of the various zones as closely as possible.

In general, the average residence time of the reaction mixture and polymer product in the extruder is about 1–20 minutes. In this connection it should be pointed out that the prepolymer, reaction monomers used, choice of catalyst and the level of catalyst concentration in carrying out the polymerization reaction will determine the residence time in the various zones. It is preferred that the catalyst and the level of concentration of the catalyst in the reaction mixtures are so chosen that no significant reaction takes place until the thiourethane prepolymer and reaction monomers reach the mixing zone.

The shaped reaction mixture which leaves the extrusion zone can be fed directly to an injection molding machine for formation into a desired product. Such a mode of operation avoids the intermediate step of cooling the extruded material and storing the material before remelting for injection molding purposes. Or alternatively, the polymer may be formed and molded into the final shape using a single machine as in the reaction injection molding process. More commonly, the reaction polymer obtained in the process of the invention is extruded from the extrusion zone in a form of a sheet or strand which is subsequently cooled and chopped into pellets. The pellets may than be stored and used to produce the desired product in an injection molding machine or other similar device using molds of various shapes and designs depending on the end use desired, e.g., plate, lens, cylinder, prismatic, conical, spherical, progressive and bifocal.

The prepolymer is preferably formed outside the extruder in a reactor. The prepolymer may be formed in the extruder by adding the diisocyanate and dithiol to the feed zone and polymerizing the mixture in the extruder to form the prepolymer. Alternatively, final polymers can be formed in a single extruder where the prepolymer can be formed in the feed zone and/or the mixing zone of an extruder with the other polyurethane reaction monomers being added after the prepolymer is formed and the polymerization reaction then completed in the extruder.

While not preferred, the polymer of the invention may be made by mixing together a thiourethane prepolymer and a urethane prepolymer.

Secondary lens processing can also be applied to optical products obtained from the optical material according to this invention. For example, the optical products may be coated with a silica, titania, and/or zirconia-based hard coating material or an organic hard coating material of the ultraviolet curable type so as to form a hard surface layer, whereby the surface hardness is enhanced. The resin of the invention offers the advantage that, in some cases, no special pretreatment of the lens surface is needed to produce good adhesion between the lens and the coating. It is possible to coat the lenses by the process described herein with a monolayer or multilayer antireflective coating of metal oxides, metal fluorides, or other such materials deposited through vacuum evaporation, sputtering, or some other method.

The optical materials provided by this invention may also be made photochromic through incorporation of naphopyran compounds, spiro compounds, indoline compounds, and/or other such photochromic materials. The aforementioned photochromic materials may be incorporated into the enhanced optical materials disclosed in this patent through tinting, mixing with monomer components before or during polymerization, thermal transfer, or some other such technique. European patent application 88304403.4 discusses improved fatigue resistance for reversible cleavage photochromics when incorporated into polyurethane plastics, especially thermosetting polyurethanes.

The invention will be described by reference to the following examples which are not intended to be limiting.

The physical properties of the polymer product of the subject invention were determined according to the following methods.

(1) Refractive Index: The refractive index was measured using a Metricon Model 2010 Prism Coupler at 20° C.

(2) Abbe Number: The Abbe number was measured using a Metricon Model 2010 Prism Coupler at 20° C. according the following equation:

$$V_d = \frac{n_D - 1}{n_F - n_C}$$

where $n_D$ is the refractive index determined at 589.3 nm, $n_F$ is the refractive index determined at 486.1 nm, and $n_c$ is the refractive index determined at 656.3 nm.

(3) Shore D Hardness: The Shore D hardness was measured using HP-DR Durometer tester.

(4) Polymer Color: The color of the polymers was measured using BYK Gardener Optical Spectrophotometer on compression molded disks.

(5) Tintability: The lenses were tinted using BPI® Molecular Catalytic Black dye in a recommended concentration of water solution and followed by visual examination and measurement of optical transmittance on a BYK optical spectrophotometer.

(6) Impact Resistance: According to the standards set forth for street eyewear as well as for occupational and educational eyewear specified in ANSI Z-87.1 and FDA 21 CFR 801.4.0.

EXAMPLES 1–7

The following polymers were made by heating the aliphatic diisocyanate component and dithiol component and an antioxidant Irganox 1010 (produced by Ciba Geigy Corp.) in a round bottom flask equipped with a stirrer, thermometer, gas inlet and vacuum adapter. The mixture was stirred at room temperature under vacuum for at least 2 hours for degassing. A dimethyltin dichloride catalyst was added at a concentration between about 50 and 5000 ppm and the mixture heated under nitrogen at between 90° to 120° C. for 30 minutes. The prepolymer produced was characterized by Differential Scanning Calorimeter, Fourier Transform Infrared Spectrometer and Gel Permeation Chromatography. The prepolymer was then mixed with either the aromatic diisocyanate or diol component for about 0.5 to 2 minutes under nitrogen until the mixture was homogeneous. While the mixture was maintained at 200°–210° C., the other component was then added to the homogeneous mixture with vigorous stirring. This was continued for about 2 to 3 minutes until a high viscosity is achieved. The polymer was cooled under the nitrogen blanket and placed into an oven at 125° C. for 10 to 24 hours. The use of a nitrogen blanket substantially reduced the yellowness of the resin.

The resulting polymers were compression molded in 1.3 mm. thick circular disks having a diameter of 38.1 mm at a temperature of 180°–200° C. for 10 minutes. All samples released easily from the mold using a fluorocarbon based mold release agent.

The polymer compositions are shown in Table I.

TABLE 1

| RUN | MDI | HMDI | TCD | EBISA | CHDM | PCD | DMDS | IMB |
|---|---|---|---|---|---|---|---|---|
| 1 | 0.165 | 0.310 | | | 0.175 | | 0.325 | 0.025 |
| 2 | 0.075 | 0.425 | 0.075 | | | | 0.425 | |
| 3 | 0.125 | 0.375 | | | 0.125 | | 0.375 | |
| 4 | 0.150 | 0.350 | | | 0.150 | | 0.350 | |
| 5 | 0.175 | 0.325 | | | 0.175 | | 0.325 | |

TABLE 1-continued

| RUN | MDI | HMDI | TCD | EBISA | CHDM | PCD | DMDS | IMB |
|---|---|---|---|---|---|---|---|---|
| 6 | 0.166 | 0.344 | 0.100 | | | 0.050 | 0.350 | |
| 7 | 0.100 | 0.400 | | 0.150 | | | 0.350 | |

MDI is 4,4'-methylene bis(phenyl isocyanate)
HMDI is 4,4'-methylene bis(cyclohexyl isocyanate)
TCD is tricyclodecane dimethanol
EBISA is diethoxylated Bisphenol A
CHDM is cyclohexane dimethanol
PCD is supplied by Stahl USA and is a polycarbonate diol tradename KM-10-1667
DMDS is bis(2-mercaptoethyl) sulfide
IMB is 1,3-bis(isocyanatomethyl)benzene The results are shown in Table II.

TABLE II

| RUN | REFRACTIVE INDEX | ABBE NO. | Tg (° C.) | SHORE D HARDNESS |
|---|---|---|---|---|
| 1 | 1.594 | 35 | 116 | 87 |
| 2 | 1.596 | 38 | 115 | 87 |
| 3 | 1.593 | 36 | 110 | 87 |
| 4 | 1.593 | 35 | 110 | 87 |
| 5 | 1.594 | 34 | 113 | 87 |
| 6 | 1.579 | 36 | 115 | 87 |
| 7 | 1.590 | 35 | 113 | 86 |

The results show that the thermoplastic thiourethane-urethane copolymers of the invention have the properties needed to be used for optical uses such as ophthalmic lenses. All the polymers passed the educational and occupational ANSI standard with a thickness of 1.3 mm. flat sheet form. All the polymers had acceptable polymer color, i.e., a yellowness index of 2 or less according to ASTM D1925 measured on a BYK optical spectrophotometer and were tintable.

For comparative purposes, Dow Chemical commercial thermoplastic polyurethanes are shown having the following properties:

| Thermoplastic Polyurethane | Refractive Index ($n_d$) | Abbe Number ($V_d$) | Hardness (Shore D) |
|---|---|---|---|
| Isoplast 301 | 1.5952 | 28 | 88 |
| Pellethane 2101-65D | 1.5687 | 32 | 65 |
| Pellethane 2103-90A | 1.5526 | 33 | 40 |
| Pellethane 2363-75D | 1.5776 | 32 | 75 |

As can be seen, these commercial polyurethanes do not exhibit the combined high refractive index and Abbe No. values characteristic of the polymers of the invention. The hardness values are also inferior to the resins of the invention.

The hardness values of the commercial materials with an Abbe number above 30 are far too low for consideration as an opthalmic lens material which requires a Shore-D hardness of at least 85. Additionally, the materials with an Abbe number above 30 also have a refractive index below 1.58 which is well below that of the materials of this invention. Isoplast®301 is a material with a hardness, refractive index, and Tg nearly suitable for ophthalmic lens use, but the extremely low Abbe number of this material would make it an exceptionally poor choice for an ophthalmic lens material due to an unacceptably high level of chromatic aberration in lenses made from this material. Additionally, commercially available polyurethanes as shown in the above table are typically characterized by a high yellowness index above 2 as well as inherently poor resistance to yellowing when exposed to heat or U.V. radiation.

The product of the current invention shows a substantially reduced initial yellowness index relative to current commercial polyurethanes as well as substantially improvements in resistance to yellowing upon exposure to heat or U.V. radiation. No commercially available thermoplastic polyurethanes are known to exhibit the superior combination of properties produced by using the method of this invention.

EXAMPLE 8

A polymer corresponding to Run 4 was produced by reaction extrusion on a Welding Engineers Model No. HT-0.8-222-22-E10.8. inch counter rotating non-intermeshing twin screw extruder having a total length to diameter ratio of 66:1. A feed port through which the granulated prepolymer was fed was placed in the barrel section closest to the screw hub, approximately 12 barrel diameters of barrel length were used to melt and convey the prepolymer to the CHDM mixture and MDI injection zone. The barrel length where the CHDM and MDI were injected consisted of approximately 12 diameters. The MDI was injected first to allow it to react first with the less reactive mercapto moiety of the prepolymer. After both MDI and the CHDM mixture were injected the polymerization mixture was then passed into a reaction zone of about 24 diameters. No high shear mixing devices or screw modifications were required to provide adequate dispersive and distributive mixing. The distributive mixing was provided by the counter rotating design resulting in barrel to barrel material transfer, combined with the dispersive action of shearing between the barrel and screw to produce a homogeneous product without the degradation which may result from excessive shear. After exiting the reaction zone the material was conveyed through a melt seal into a devolatilization zone of about 6 barrel diameters where vacuum was applied to eliminate bubbles in the extruded product. The material was then conveyed through another 6 barrel diameters of twin screws and 6 barrel diameters of a single screw through a 2 hole strand dieface. The final section of the extruder was used to cool the polymer to a temperature below 175° C. As the polymer exited the extruder it was cooled with a jet of nitrogen from below and fed onto a conveyer.

The prepolymer was granulated for feeding into the extruder. Gear pumps were used to feed the CHDM and MDI. The prepolymer had a composition by weight of about 62.4% HMDI and 36.8% DMDS, 0.7% Irganox 1010 and 0.09% dimethyltin dichloride. The prepolymer feed rate was 12.6 lb/hr, the MDI 3.53 lb/hr and the CHDM 1.87 lb/hr. The CHDM contained 100 parts 1,4-cyclohexanedimethanol, 0.2 parts UV absorber and 0.8ppm dye. Screw speed was about 200 rpm. The barrel temperature profile was about 110° C. in the prepolymer feed section, about 150° C. in the intermediate melting and conveying section, about 195° C. in the MDI and CHDM injection zones, about 195° C. to 205° C. in the reaction section, and the polymer cooled to about 165° C. as it passed through the devolatilization and final conveying zones.

The extruded polymer exhibited little or no yellowness as it left the extruder and was essentially bubble free. The glass transition temperature was about 120° C., the refractive index 1.594 and that Abbe number 35.

The art shows extrusion polymerization processes to make polymers. U.S. Pat. No. 5,455,312 shows a process for the preparation of plastics containing thermoplastic polyurethanes comprising melting and homogenizing the polyurethane in an extruder and then adding an isocyanate to the extruder. U.S. Pat. Nos. 4,261,946 and 4,342,847 show the addition of a thermoplastic polymer into an extruder along with polyurethane forming components. U.S. Pat. No. 4,438,250 shows the mixing of aromatic diisocyanates with prepolymers containing terminal isocyanate groups and selectively reacting the mixture with water to form the bis (isocyanato urea) which accumulates in the form of a readily processible suspension in the prepolymer. U.S. Pat. No. 4,762,883 shows a solution of a non-reactive polymer in a liquid oxazoline which may contain reactive additives such as a polyisocyanate and thiols to provide solid polymers by interpolymerization of the oxazoline and reactive additive. All the above patents are incorporated herein by reference. None of the above patents show the process of the invention.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for the preparation of optical thermoplastic thiourethane-urethane polymers comprising:

reacting a monomer composition comprising an organic polyisocyanate and a monomer having at least two groups reactive with the isocyanate component under polymerization conditions to form a thiourethane prepolymer having reactive endgroups with the molar ratio of isocyanate group to reactive group about 0.5:1 to 3:1;

reacting the prepolymer under polymerization conditions with polyurethane forming monomers comprising an organic polyisocyanate and a monomer having at least two groups reactive with the isocyanate group to form the optical polymer product with the molar ratio of isocyanate groups used to form the prepolymer and the polymer product to the total reactive groups used to form the prepolymer and the polymer product being about 0.9:1 to 1.1:1.

2. The method of claim 1 wherein the prepolymer is formed by reacting a polyisocyanate and a polythiol.

3. The method of claim 2 wherein the polyisocyanate used to form the prepolymer is diisocyanate and the polythiol is a dithiol.

4. The method of claim 3 wherein the diisocyanate used to form the prepolymer is selected from the group consisting of aliphatic, cycloaliphatic and mixtures thereof.

5. The method of claim 4 where the diisocyanate used to form the prepolymer is selected from the group consisting of methylene bis(cyclohexyl isocyanate), 4,4'-isopropylidene bis(cyclohexyl isocyanate), diisocyanate dicyclohexyl, 2,5-bis(isocyanatomethyl) bicyclo(2.2.1) heptane, 4,8-bis (isocyanatomethyl) tricyclo-($5.2.1.0^{2.6}$) decane.

6. The method of claim 4 wherein the dithiol used to form the prepolymer is bis(2-mercaptoethyl) sulfide, 1,2 ethane dithiol or bis(2-mercaptoethyl) ether.

7. The method of claim 1 wherein the prepolymer is reacted with both diisocyanate and a diol.

8. The method of claim 2 where the prepolymer is reacted with both a diisocyanate and a diol.

9. The method of claim 3 wherein the prepolymer is reacted with both a diisocyanate and a diol.

10. The method of claim 4 wherein the prepolymer is reacted with both a diisocyanate and a diol.

11. The method of claim 1 wherein the prepolymer and polyurethane forming monomers are reacted in an extruder.

12. The method of claim 11 wherein the extruder is a non-intermeshing counter rotating twin screw extruder.

13. The method of claim 4 wherein the prepolymer and polyurethane forming monomers are reacted in an extruder.

14. The method of claim 7 wherein the polyurethane forming monomer is 4,4'-methylene bis(phenyl isocyanate) and the polyisocyanate used to form the prepolymer is selected from the group consisting of methylene bis (cyclohexyl isocyanate, 4,4'-isopropylidene bis(cyclohexyl isocyanate), diisocyanate dicyclohexyl, 2,5-bis (isocyanatomethyl) bicyclo (2.2.1) heptane, 4,8-bis (isocyanatomethyl) tricyclo-(5.2.1.0$^{2.6}$) decane.

15. The method of claim 14 wherein the polyurethane forming monomer is 1,4-dimethanol cyclohexane or diethyoxylated Bisphenol A.

16. The method of claim I wherein the molar ratio of isocyanate to isocyanate reactive component to form the prepolymer is about 0.9:1 to 1.1:1 and the molar ratio of isocyanate to isocyanate reactive component in the final polymer is about 1:1 to 1.05:1.

17. The method of claim 16 wherein the prepolymer molar ratio is about 0.98:1 to 1.02:1.

18. The polymer product made by the method of claim 1.
19. The polymer product made by the method of claim 2.
20. The polymer product made by the method of claim 3.
21. The polymer product made by the method of claim 4.
22. The polymer product made by the method of claim 5.
23. The polymer product made by the method of claim 6.

24. A method for the preparation of optical thermoplastic thiourethane-urethane polymers comprising:

reacting a monomer composition comprising an aliphatic polyisocyanate and a polythiol under polymerization conditions to form a thiourethane prepolymer having reactive endgroups with the molar ratio of isocyanate group to thiol group being about 0.9:1 to 1.1:1; reacting the prepolymer under polymerization conditions with a polyisocyanate and a polyol to form the optical polymer product with the molar ratio of isocyanate group used to form the prepolymer and the polymer product to the total thiol and OH group used to form the prepolymer and the polymer product being about 0.9:1 to 1.1:1.

25. The method of claim 24 wherein the aliphatic polyisocyanate is a cycloaliphatic polyisocyanate.

26. The method of claim 25 wherein the cycloaliphatic polyisocyanate is methylene bis(cyclohexyl isocyanate) and the polythiol is bis(2-mercaptoethyl) sulfide, 1,2 ethane dithiol or bis(2-mercaptoethyl) ether.

27. The method of claim 26 wherein the prepolymer is reacted with 4,4'-methylene bis(phenylisocyanate) and 1,4-dimethylcyclo hexanediol or diethyoxylated Bisphenol A.

28. The method of claim 27 wherein the prepolymer and the polyisocyanate and polyol reacted with the prepolymer are reacted in an extruder.

29. The method of claim 28 wherein the extruder is a non-intermeshing counter rotating twin screw extruder.

30. The method of claim 29 wherein the molar ratio of aliphatic polyisocyanate to polythiol to form the prepolymer is about 0.98:1 to 1.02:1 and the molar ratio of isocyanate to thiol and OH in the final polymer is about 0.98:1 to 1.02:1.

31. The method of claim 29 wherein the molar ratio of isocyanate to thiol and OH in the final polymer is about 1:1 to 1.05:1.

* * * * *